(12) United States Patent
Haghayeghi

(10) Patent No.: US 6,899,300 B2
(45) Date of Patent: May 31, 2005

(54) PROCESS FOR THE LOADING OF FUEL INTO AN AIRCRAFT ON THE GROUND

(75) Inventor: Ali Haghayeghi, Sainte Foy de Peyrolieres (FR)

(73) Assignee: Airbus, Blagnac (FR)

( * ) Notice: Subject to any disclaimer, the term of this patent is extended or adjusted under 35 U.S.C. 154(b) by 94 days.

(21) Appl. No.: 10/720,151

(22) Filed: Nov. 25, 2003

(65) Prior Publication Data

US 2004/0245396 A1 Dec. 9, 2004

(30) Foreign Application Priority Data

May 2, 2003 (FR) .............................. 03 05407

(51) Int. Cl.[7] .......................... B64C 17/10; B64D 37/16
(52) U.S. Cl. .............................. 244/135 C; 244/135 A; 244/135 R
(58) Field of Search ................. 244/135 C, 135 A, 244/135 R; 137/571, 572

(56) References Cited

U.S. PATENT DOCUMENTS

| 2,823,880 | A | * | 2/1958 | Bergeson ................ 244/135 C |
| 2,884,948 | A | * | 5/1959 | Weiss ........................ 137/390 |
| 2,960,294 | A | * | 11/1960 | Johnston et al. ........ 244/135 R |
| 3,419,233 | A | | 12/1968 | Wotton |
| 4,591,115 | A | * | 5/1986 | DeCarlo ................. 244/135 C |
| 4,913,380 | A | * | 4/1990 | Vardaman et al. ...... 244/135 R |
| 4,918,619 | A | * | 4/1990 | Orloff et al. .................. 702/52 |
| 5,321,945 | A | | 6/1994 | Bell |
| 6,125,882 | A | * | 10/2000 | Kong .......................... 137/558 |

FOREIGN PATENT DOCUMENTS

FR     1511741     2/1968

OTHER PUBLICATIONS

Preliminary Search Report dated Dec. 2, 2003.

\* cited by examiner

*Primary Examiner*—Tien Dinh
(74) *Attorney, Agent, or Firm*—Stevens, Davis, Miller & Mosher, LLP

(57) ABSTRACT

A process for loading of fuel into an aircraft on the ground, wherein an optimal position Cgt of the center of gravity of the aircraft is aimed for by adjusting the weight of fuel poured into the tail tank of the aircraft.

8 Claims, 5 Drawing Sheets

PROCESS FOR THE LOADING OF FUEL INTO AN AIRCRAFT ON THE GROUND

Field of the Invention

The present invention relates to a process for the loading of fuel into an aircraft on the ground.

BACKGROUND OF THE INVENTION

It is known that the filling of the tanks of a wide-bodied aircraft on the ground is managed automatically by a computer that computes, as a function of the quantity of fuel necessary in order for said aircraft to accomplish its mission, the various weights of fuel to be poured into the various tanks in order for, at each instant of filling, the center of gravity of said aircraft to be kept in an authorized range of positions along the longitudinal axis of said aircraft.

Thus, good centering of said aircraft is obtained continuously, thereby ensuring satisfactory stability and enabling it, after filling, to be easily controllable.

It is known, moreover, that a modern civil aircraft comprises at least one fuel tank disposed in the tail and that, in the case of a wide-bodied aircraft, the capacity of this tail tank is considerable. Furthermore, if this aircraft is of the wide-bodied type, the distance separating this tail tank from the center of the aircraft is large. Now, this distance constitutes the lever arm with which the weight of fuel contained in the tail tank exerts a moment on said aircraft. This moment may therefore be very considerable and exert a strong aircraft destabilizing action. The filling of the tail tank with fuel is therefore critical for the stability of the aircraft.

SUMMARY OF THE INVENTION

An object of the present invention is to remedy this drawback. It relates to a process for loading fuel into an aircraft on the ground ensuring the stability and the centering of said aircraft without any risk of destabilization during the filling of the tail tank and even making it possible to afford said aircraft optimal pilotability during the phase of take-off and the start of the flight.

For this purpose, according to the invention, the process for the loading of fuel into an aircraft on the ground, said aircraft comprising fuel tanks distributed in the wings and the fuselage and at least one fuel tank disposed in the tail, said process making it possible at each instant of the loading to keep the center of gravity of said aircraft in an authorized range of positions along the longitudinal axis of said aircraft and taking into account:

the cargo weight MC, without fuel, carried by the aircraft;
the position XC, within said authorized range, of the center of gravity of said aircraft on the ground, when only said cargo weight MC is loaded and distributed in the aircraft; and
the weight of fuel PFQ necessary for the accomplishment of the mission that said aircraft is to fulfill with said cargo weight MC, is noteworthy in that:

an optimal position CGt to be reached for said center of gravity is determined, within said authorized range, when said cargo load MC and said weight of fuel PFQ necessary for the mission are loaded on board said aircraft;
the relation (R) linking the variation in position of the center of gravity of the aircraft to the variation in weight of fuel inside said tail tank is determined;
weights of fuel are poured into said tanks, the sum of which weights constitutes a provisional loading weight MP, which is less than said weight of fuel PFQ necessary for the mission and which, added to said cargo weight MC, causes the center of gravity of the aircraft to go from said position XC corresponding to the latter to a provisional position XP, such that the feeding into said tail tank of a weight of fuel equal to the difference $\Delta$ between the weight of fuel PFQ necessary for the mission and said provisional loading weight MP causes, in accordance with said relation (R), said center of gravity of the aircraft to go from the provisional position XP to the optimal position CGt; and
a weight of fuel equal to said difference $\Delta$ is poured into said tail tank.

Thus, according to the invention, by making advantageous use of the big lever arm offered by the tail tank, the position of the center of gravity is adjusted to an optimal position ensuring the best stability of the aircraft on the ground, on take-off and at the start of the flight. Moreover, since the tanks of an aircraft are in communication with one another through controllable links, this optimal position can be maintained while cruising, by transferring fuel between said tanks. The pilotability, of the aircraft is therefore optimal on the ground, during take-off and in flight. Furthermore, the drag and the fuel consumption are minimal. Moreover, the moments exerted by the aerodynamic loads supported by certain parts of the aircraft in flight, for example the wings, are reduced, so that it is possible to lighten said parts and, therefore, to decrease the overall weight of the aircraft.

The provisional loading weight MP may result only from weights of fuel poured into just the tanks of the wings and of the fuselage. However, it may also comprise a weight of fuel poured into said tail tank, prior to the pouring into the latter of the weight of fuel equal to said difference $\Delta$. Moreover, at least some of said weights of fuel may not be poured just once, but on the contrary by successive fractions, in particular so as to better curb the variation in position of the center of gravity in said authorized range.

To be able to begin the loading of fuel prior to exact and definitive knowledge of the cargo weight and of the corresponding position of the center of gravity, the process can be implemented with values MC and XC which are, in reality, default values of the actual and definitive cargo weight MC* and of the actual and definitive position XC* of the center of gravity. In this case, after loading of the tanks with the weight of fuel PFQ necessary for the accomplishment of the mission and obtaining of the optimal position CGt for the center of gravity on the basis of said default values MC and XC, the weight of fuel PFQ is redistributed by transfer between said tanks, with partial transfer from said tail tank into said other tanks, so as to take account of said actual values MC* and XC* while keeping the center of gravity at said optimal position CGt.

Moreover, it may happen, for example subsequent to a last minute modification of the flight plan or of the meteorological conditions along the path of the mission, that, after loading of said tanks with the weight of fuel PFQ necessary for the accomplishment of the mission and reaching of the optimal position CGt for the center of gravity, said weight of fuel PFQ must be increased by an additional weight dPFQ. In this case, said additional weight dPFQ is distributed into said tanks while keeping the center of gravity at said optimal position CGt. Such a distribution of the additional weight of fuel dPFQ can be effected, as the case may be, either only into said tanks of the wings and of the fuselage, or into them and into said tail tank.

BRIEF DESCRIPTION OF THE DRAWINGS

The figures of the appended drawing will illustrate the manner in which the invention may be embodied. In these figures, identical references designate similar elements.

DETAILED DESCRIPTION OF THE INVENTION

Figure 1:
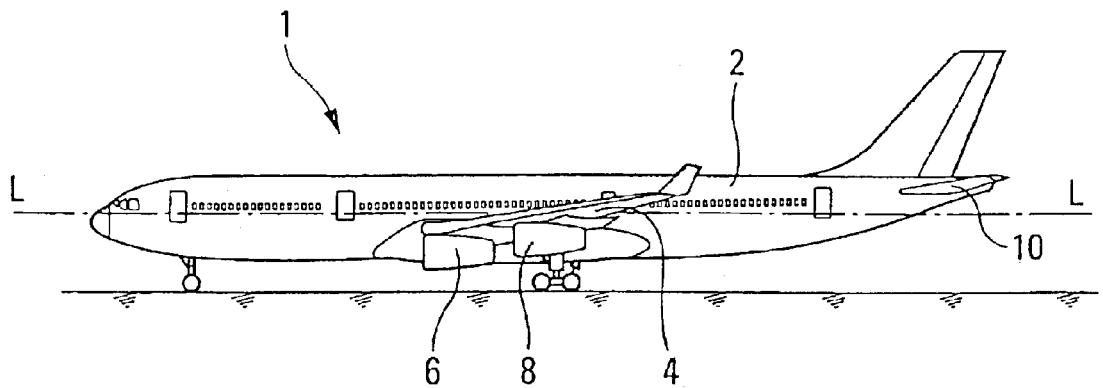
FIG. 1 is a view in elevation of a wide-bodied airplane standing on the ground.
Figure 2:
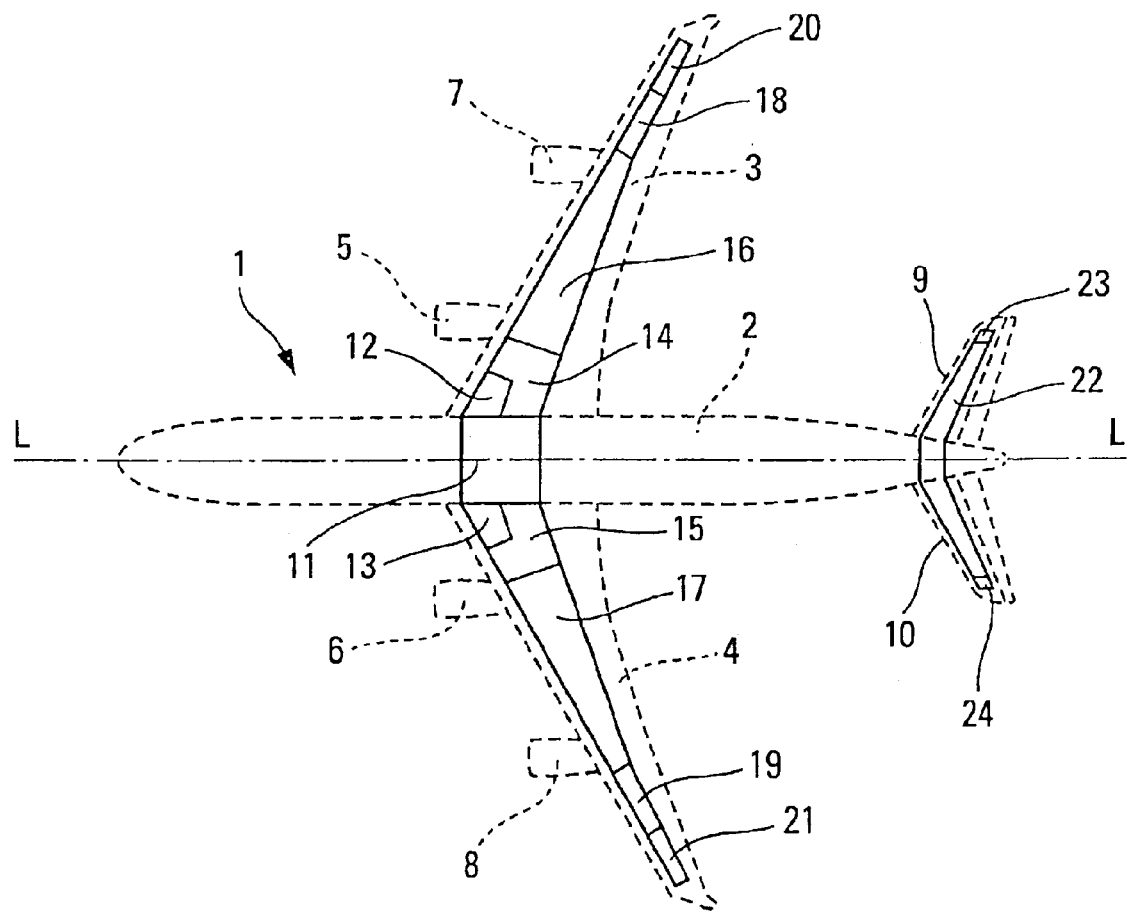
FIG. 2 is a view from above of the wide-bodied airplane of FIG. 1, in which the outline of said airplane is represented dashed, whereas its tanks are represented by solid lines.
Figure 3:
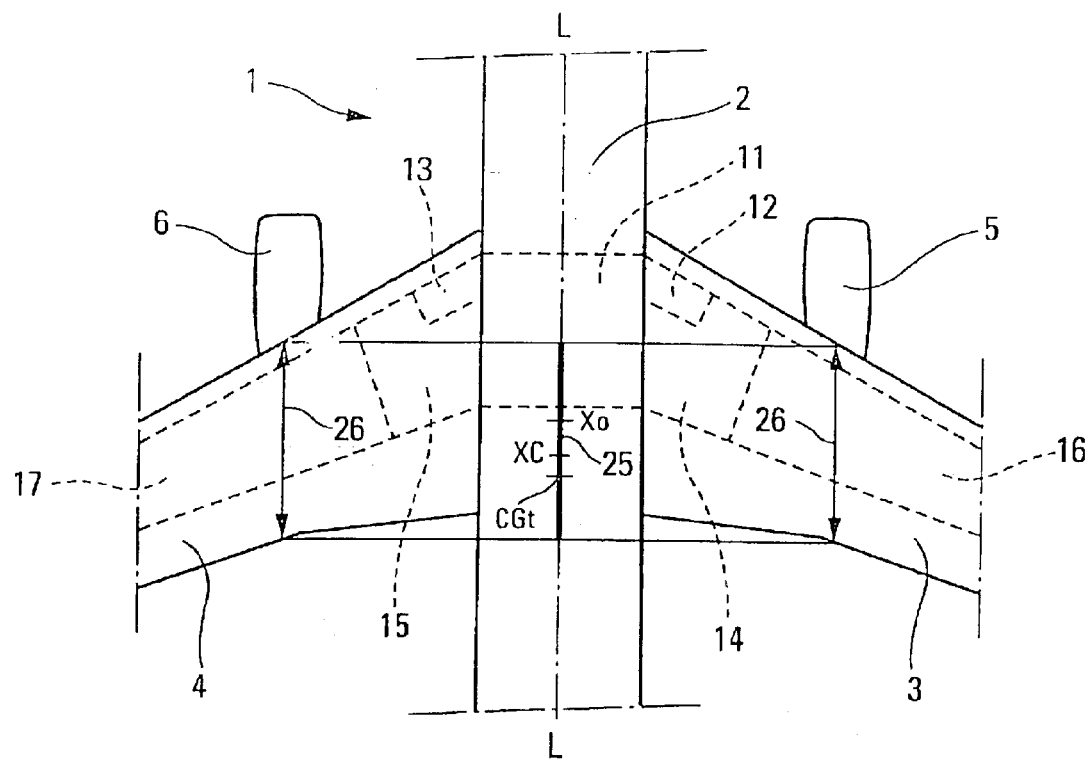
FIG. 3 is an enlarged partial plan view of the airplane of FIGS. 1 and 2 illustrating the authorized range of positions for the center of gravity of said airplane.

The wide-bodied airplane 1, represented diagrammatically in FIGS. 1 to 3, comprises a fuselage 2 with longitudinal axis L-L and two wings 3 and 4 symmetric with respect to said fuselage. Each wing 3 or 4 carries an inboard engine 5 or 6 and an outboard engine 7 or 8. The fuselage 2 furthermore comprises a rear empennage comprising two tailplanes 9 and 10, symmetric with respect to said fuselage 2.

As is shown in FIG. 2, the airplane 1 comprises a plurality of fuel tanks, namely:

a central tank 11, provided in the fuselage 2 in the forward part between the two wings 3 and 4;

two tanks 12 and 13 for supplying the inboard 5 and outboard 6 engines;

two inboard tanks 14 and 15;

two intermediate tanks 16 and 17;

two outboard tanks 18 and 19; and two venting tanks 20 and 21, said tanks 12, 13; 14, 15; 16, 17; 18, 19 and 20, 21 being disposed respectively in the wings 3 and 4, pairwise symmetrically with respect to one another, as well as:

a tail tank 22, disposed symmetrically in the tailplanes 9 and 10 and in the tail part of the fuselage 2; and two symmetric venting tanks 23 and 24 in communication with the tail tank 22.

In a known manner, the manufacturer of the airplane 1 defines an authorized range 25 for the position of the center of gravity of the airplane along the longitudinal axis (see FIG. 3). In the exemplary embodiment represented, the authorized range 25 corresponds to the chord 26, projected onto the longitudinal axis L-L called the reference chord, of the wings 3 and 4 at the level of the inboard engines 5 and 6. As may be seen, when empty (without fuel, without passengers, without freight, etc.), the center of gravity of the airplane is at the position Xo.

Figure 4:
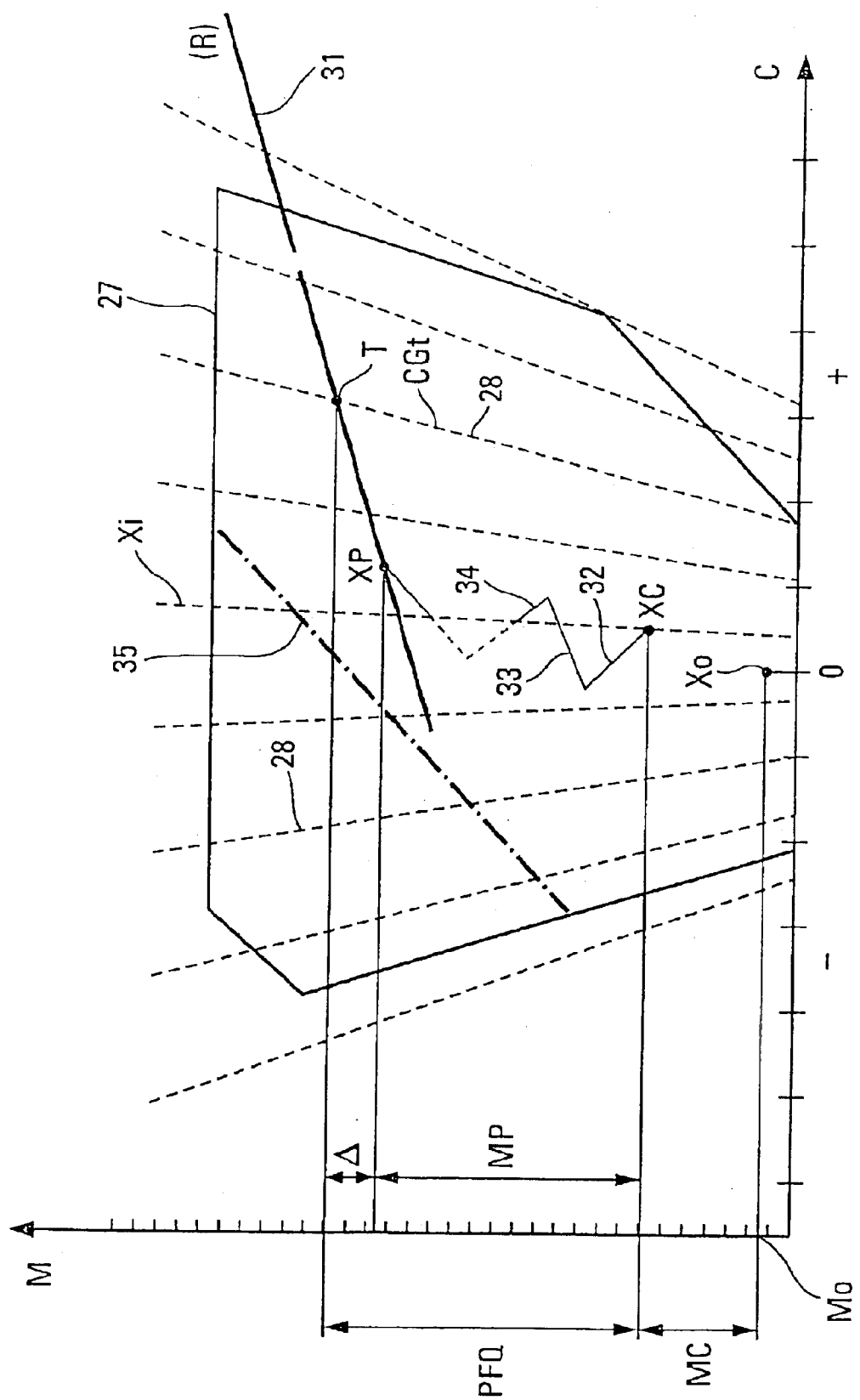
FIG. 4 is a chart illustrating the process for loading fuel into the airplane of FIGS. 1 to 3, in accordance with the present invention.

As shown by FIG. 4, this authorized range 25 corresponds to a loading envelope 27, provided by the manufacturer of the airplane and plotted in a reference frame whose abscissa axis carries the moments C exerted by the loads about the position Xo (for which the airplane when empty exhibits the weight Mo) and whose ordinate axis carries the weights M. Straight lines 28, each of which corresponds to a position Xi of the center of gravity in the authorized range 25, are plotted superimposed on this envelope. 27. In a known manner, each position Xi is defined by a percentage of the reference chord. In FIG. 4, the straight lines 28 represent, from left to right, positions Xi corresponding to larger and larger fractions of the reference chord 26. These straight lines 28 diverge with increasing weights, on account of the fact that the greater the total weight of the airplane, the less effect a specified weight increase has on the position of the center of gravity.

Figure 5:
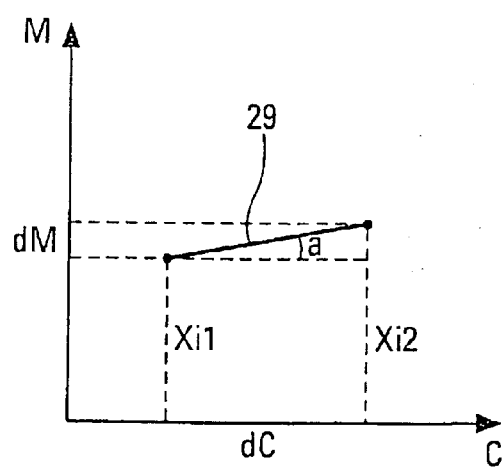
FIGS. 5 and 6 illustrate the action produced, in the chart of FIG. 4, by the pouring of weights of fuel into the tanks of said airplane.
Figure 6:
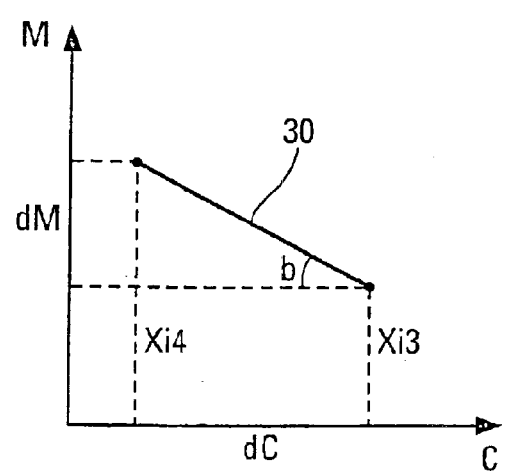

In the chart of FIG. 4, the origin of the moments C corresponds to the position Xo when empty, the negative values (−) on the moments axis corresponding to forward displacements of the center of gravity of the airplane 1, and the positive values (+) of said moments axis corresponding to rearward displacements of the center of gravity of the airplane 1. As shown by FIG. 5, an increase in load dM rearward of the origin defined by the position Xo engenders an increase in moment dC, causing the center of gravity to go from the position Xi1 to a more rearward position Xi2. The increase in moment dC is linear as a function of the increase in load dM, since it depends only on the distance (lever arm) from this increase in load to the origin defined by Xo. In the C, M axis system, the variation in dC as a function of dM. is therefore represented by a linear characteristic 29, whose positive slope a is characteristic of the rearward location of the increase in load dm Of course, this linear characteristic 29 is equally representative of the variation in position of the center of gravity $dXi=Xi2-Xi1$ as a function of the weight variation dM. Likewise, as shown by FIG. 6, an increase in load dM forward of the origin defined by the position Xo engenders an increase in moment dC, causing the center of gravity to go from the position Xi3 to a more forward position Xi4. Likewise depending only on the distance from the increase in load to said origin, the variation in dC as a function of dM can therefore be represented by a linear characteristic 30, whose negative slope b is characteristic of the forward location of the increase in load dM. The linear characteristic 30 is equally representative of the variation in the position of the center of gravity $dXi=Xi4-Xi3$ as a function of the weight variation dm.

In the chart of FIG. 4, the position of the center of gravity of the airplane 1 has been represented, after loading of the cargo weight MC (passengers, freight, etc.), but prior to the loading of the fuel, as being at the position Xi=XC aft of the position Xo. Also represented is the weight of fuel PFQ necessary for the accomplishment of the mission that the aircraft 1 is to fulfill with the cargo weight MC.

The optimal position. (as regards the centering of the airplane 1) that the center of gravity of said airplane is to occupy after loading of the cargo weight MC and of the weight of fuel PFQ is determined, within the authorized range 25, by computation taking into account the characteristics of the aircraft, the empty weight Mo, the cargo weight MC, the weight of fuel PFQ. This optimal position bears the reference CGt in FIG. 4. Thus, after such loading, the airplane 1 must be in the state represented by the point T of the straight line 28 corresponding to the position CGt, for which the weight of the airplane 1 is equal to -the sum Mo+MC+PFQ.

Moreover, the relation (R) of the type $dXi=k.dM$ is determined, linking the variation in position dXi of the center of gravity of the aircraft 1 to the variation in weight of fuel dM inside the tail tank 22. In this relation (R), the letter k designates a constant representative of the distance between the position Xo and said tail tank 22. The graphical representation of this relation (R) in the chart of FIG. 4 is a straight line similar to the linear characteristic 29 of FIG. 5. Represented in FIG. 4 is the corresponding characteristic 31 passing through the point T defined above.

In accordance with the present invention, weights of fuel, whose sum constitutes a provisional loading weight MP, which is less than the weight of fuel PFQ necessary for the accomplishment of the mission and which, added to the cargo weight MC, causes the center of gravity of the aircraft 1 to go from the position XC to a provisional position XP, are poured into said tanks 11 to 19 and possibly 22. This provisional loading weight MP is chosen to correspond to the intersection between the straight line 28 relating to the position XP (not represented) of the center of gravity and the linear characteristic 31.

Of course, during this loading operation, similar weights of fuel are poured into symmetric tanks. Each weight of fuel added to the central tank 11 (and possibly to the tail tank 22) and the weights of fuel added symmetrically to the symmetric tank pairs are associated, in the chart of FIG. 4, with linear characteristics 32, 33, 34, etc. respectively similar to the linear characteristics 29 or 30 as a function of the position of the corresponding tanks, with respect to Xo. These characteristics form a broken line joining Xc (for the weight Mo+MC) to XP (for the weight Mo+MC+MP).

After loading of the provisional weight MP and reaching of the provisional position XP for the center of gravity, a weight of fuel equal to the difference Δ=PFQ−MP is poured into the tail tank 22. As a result of this, simultaneously, the total weight of the airplane 1 goes from Mo+MC+MP to Mo+MC+PFQ and the center of gravity of the latter goes from the position XP to the position CGt, moving along the characteristic 31.

On account of the fact that, by virtue of the invention, the position of the center of gravity at the optimal position CGt is ensured, it is possible to reduce the envelope 27, for example on the forward side for high weights, this being represented by the line 35 cutting the upper left corner of said envelope 27. This reduction in the envelope 27 corresponds in fact to the eliminating of particular flight conditions that are taxing for certain parts of the airplane 1. These may therefore, by virtue of the invention, be lightened, thereby reducing the total weight of the airplane.

Figure 7:
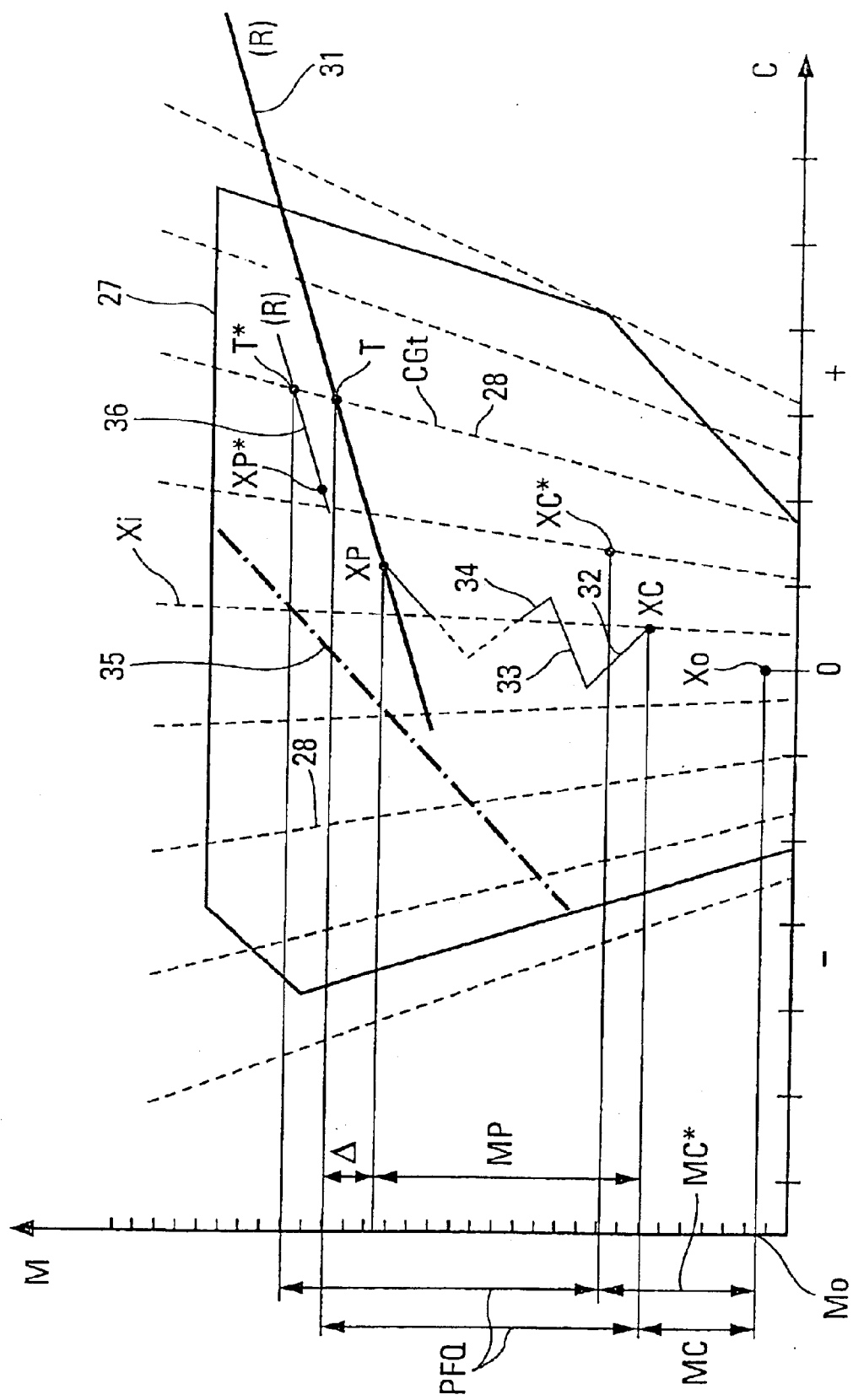
FIGS. 7 and 8 illustrate, in the chart of FIG. 4, two variants of loading of said tanks with fuel.

Illustrated in FIG. 7 is the case where the weight MC and the position XC that are used in the chart of FIG. 4 are default values of the actual cargo weight MC* and of the actual position MC*. In this situation, the point T of the straight line 28 corresponding to the position CGt is not correct and it must be replaced by the point T* of the same straight line 28 corresponding to the load Mo+MC*+PFQ. It may be seen that if MC* and XC* had been known exactly, then the characteristic 36 of the tail tank 22 passing through the point T* would have been used rather than the characteristic 31 passing through the point T. In particular, owing to the shift of the center of gravity toward increasing values (from XC to XC*), the new value XP* of the characteristic 36 (playing the role of the value XP of the characteristic 31) is itself shifted accordingly, so that it is apparent that the weight of fuel MP must be redistributed by transfer between the tanks 11 to 19 and that the weight Δ in the tail tank must be partially transferred into other tanks, to keep the center of gravity at the position CGt at T*.

Figure 8:
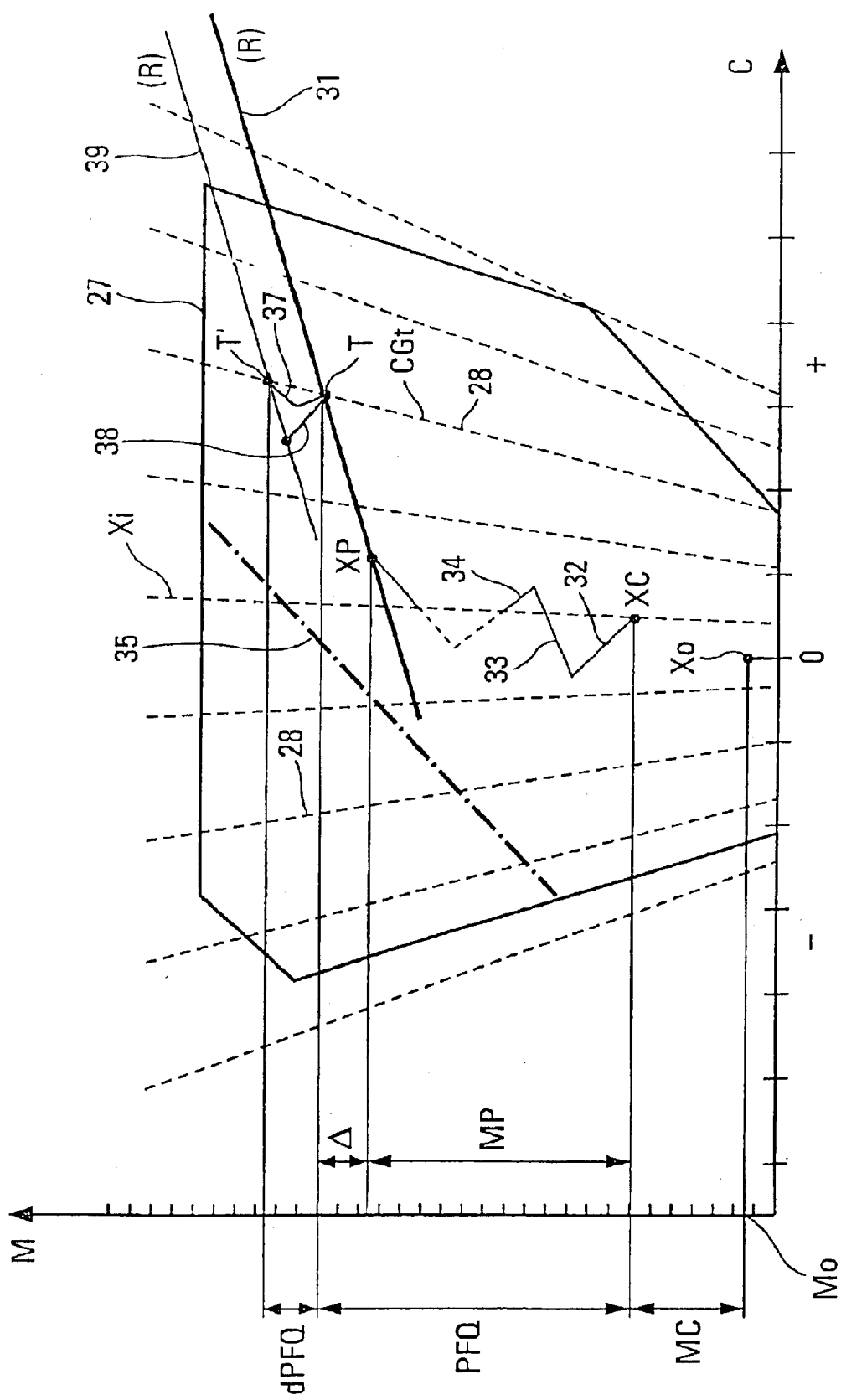

Illustrated in FIG. 8 is the case where, after loading of the tanks 11 to 19 and 22 with the weight of fuel PFQ and obtaining of the optimal position CGt (as in regard to FIG. 4), the weight PFQ must be increased by an additional weight dPFQ. In this case, the point T must go to T' of the straight line 28 corresponding to the position CGt. This may be done by redistributing, either only into the tanks 11 to 19, as illustrated by the broken line 37, or into the tanks 11 to 19 and 22, as is illustrated by the broken line 38. In the latter case, the characteristic 39 of the tail tank 22 passing through the point T' is used.

What is claimed is:

1. A process for loading of fuel into an aircraft on the ground, said aircraft comprising fuel tanks distributed in the wings and the fuselage of the aircraft and at least one fuel tank disposed in the tail of the aircraft, said process making it possible at each instant of the loading to keep the center of gravity of said aircraft in an authorized range of positions along the longitudinal axis (L-L) of said aircraft and taking into account:

the cargo weight MC, without fuel, carried by the aircraft;

the position XC, within said authorized range, of the center of gravity of said aircraft on the ground, when only said cargo weight MC is loaded and distributed in the aircraft; and the weight of fuel PFQ necessary for the accomplishment of the mission that said aircraft is to fulfill with said cargo weight MC, wherein:

an optimal position CGt to be reached for said center of gravity is determined, within said authorized range, when said cargo load MC and said weight of fuel PFQ necessary for the mission are loaded on board said aircraft;

the relation (R) linking the variation in position of the center of gravity of the aircraft to the variation in weight of fuel inside said tail tank is determined;

weights of fuel are poured into said tanks, the sum of which weights constitutes a provisional loading weight MP, which is less than said weight of fuel PFQ necessary for the mission and which, added to said cargo weight MC, causes the center of gravity of the aircraft to go from said position XC corresponding to the latter to a provisional position XP, such that the feeding into said tail tank of a weight of fuel equal to the difference Δ between the weight of fuel PFQ necessary for the mission and the provisional loading weight MP causes, in accordance with said relation (R), said center of gravity of the aircraft to go from the provisional position XP to the optimal position CGt; and a weight of fuel equal to said difference Δ is poured into said tail tank.

2. The process as claimed in claim 1, wherein said provisional loading weight MP results from weights of fuel poured only into said tanks of the wings and of the fuselage.

3. The process as claimed in claim 1, wherein said provisional loading weight MP results from weights of fuel poured into said tanks of the wings and of the fuselage, as well as into said tail tank.

4. The process as claimed in claim 1, wherein at least some of said weights of fuel are poured by successive fractions into the corresponding tanks.

5. The process as claimed in claim 1, wherein said cargo weight MC used and the center of gravity position XC used are default values of the actual cargo weight MC* and of the actual position XC* of the center of gravity and wherein, after loading of the tanks with the weight of fuel PFQ necessary for the accomplishment of the mission and obtaining of the optimal position CGt for the center of gravity on the basis of said default values MC and XC, the weight of fuel PFQ is redistributed by transfer between said tanks, with partial transfer from said tail tank into said other tanks, so as to take account of said actual values MC* and XC* while keeping the center of gravity at said optimal position CGt.

6. The process as claimed in claim 1, wherein in the case where, after loading of said tanks with the weight of fuel PFQ necessary for the accomplishment of the mission and reaching of the optimal position CGt for the center of gravity, said weight of fuel PFQ must be increased by an additional weight dPFQ, said additional weight dPFQ is distributed into said tanks while keeping the center of gravity at said optimal position CGt.

7. The process as claimed in claim 6, wherein said additional weight dPFQ is distributed only into said tanks of the wings and of the fuselage.

8. The process as claimed in claim 6, wherein said additional weight dPFQ is distributed into said tanks of the wings and of the fuselage, as well as into said tail tank.

* * * * *